(12) United States Patent
Viernekes et al.

(10) Patent No.: US 8,646,350 B2
(45) Date of Patent: Feb. 11, 2014

(54) ACTUATOR, IN PARTICULAR FOR A MOTOR VEHICLE

(75) Inventors: Gerald Viernekes, Hassfurt (DE); Klaus Zaps, Volkach (DE)

(73) Assignee: Brose Fahrzeugteile GmbH & Co., Kommanditgesellshaft Wurzburg, Wurzburg (DE)

( * ) Notice: Subject to any disclaimer, the term of this patent is extended or adjusted under 35 U.S.C. 154(b) by 1037 days.

(21) Appl. No.: 11/457,306

(22) Filed: Jul. 13, 2006

(65) Prior Publication Data

US 2007/0012125 A1  Jan. 18, 2007

(30) Foreign Application Priority Data

Jul. 15, 2005 (EP) .................................. 05015463

(51) Int. Cl.
*F16C 27/00* (2006.01)

(52) U.S. Cl.
USPC ............. 74/425; 74/606 R; 384/192; 384/199

(58) Field of Classification Search
USPC ............. 74/425, 89.14, 89.15, 409, 411, 427; 384/192, 202, 206, 208
See application file for complete search history.

(56) References Cited

U.S. PATENT DOCUMENTS

| | | | | |
|---|---|---|---|---|
| 1,680,257 A * | 8/1928 | Roberts | ..................... | 384/196 |
| 1,693,748 A * | 12/1928 | Fiegel et al. | ............. | 29/898.045 |
| 2,711,352 A * | 6/1955 | Hasko et al. | ................. | 384/208 |
| 2,804,679 A * | 9/1957 | Tracy | ....................... | 29/898.044 |
| 2,935,885 A * | 5/1960 | Saari | .............................. | 74/425 |
| 3,256,451 A * | 6/1966 | Shipman | ......................... | 310/90 |
| 3,303,557 A * | 2/1967 | Litsky | ...................... | 29/898.046 |
| 4,105,261 A * | 8/1978 | Myers et al. | .................. | 384/208 |
| 4,399,380 A * | 8/1983 | Hirano | ............................. | 310/62 |
| 4,589,297 A * | 5/1986 | Mann et al. | ..................... | 74/427 |
| 4,987,791 A | 1/1991 | Nakahashi et al. | ............. | 74/425 |
| 5,216,929 A * | 6/1993 | Ochiai et al. | ..................... | 74/425 |
| 5,917,258 A * | 6/1999 | Kershaw et al. | ................ | 310/51 |
| 6,014,915 A | 1/2000 | Evans | .............................. | 74/606 |
| 6,252,321 B1 * | 6/2001 | Fisher et al. | ..................... | 310/89 |
| 6,452,299 B2 * | 9/2002 | Drexlmaier | ..................... | 310/91 |

FOREIGN PATENT DOCUMENTS

| | | | | |
|---|---|---|---|---|
| DE | 19541118 A1 | 3/1997 | ............. | H02K 7/116 |
| DE | 10259957 A1 | 7/2004 | ................ | H02K 7/10 |
| EP | 0869295 A2 | 10/1998 | ................ | F16H 1/16 |
| EP | 0998013 A1 | 5/2000 | ............. | H02K 7/08 |
| FR | 2375572 | 7/1978 | ................ | F41G 1/00 |

\* cited by examiner

*Primary Examiner* — Richard W L Ridley
*Assistant Examiner* — Thomas Diaz
(74) *Attorney, Agent, or Firm* — Westman, Champlin & Koehler, P.A.

(57) ABSTRACT

The actuator has a gear unit with a gear housing and a motor unit with a motor housing and an internally located rotor with a drive shaft, and a cylindrical bearing housing on the drive side. The bearing housing protrudes, along with a bearing and the drive shaft ducted therein, into an opening in the gear housing. The motor housing is flange-mounted, along with a drive shaft mounted therein, to the gear housing. The outside of the bearing housing and the inside of the opening in the gear housing have been geometrically mutually harmonized such that clamping points and tension-free places will form between them when the actuator has been assembled. The pretensioning force resulting therefrom produces a permanent frictional engagement between the outer circumference of the bearing and the bearing support or the bearing shell located opposite it. The operating life of an actuator of such type is increased.

12 Claims, 5 Drawing Sheets

ACTUATOR, IN PARTICULAR FOR A MOTOR VEHICLE

PRIORITY

This application claims priority from European Patent Application No. EP05015463, which was filed on Jul. 15, 2005, and is incorporated herein by reference in its entirety.

TECHNICAL FIELD

The invention relates to an actuator having a gear unit and a motor unit. The gear unit has a gear housing and the motor unit has a motor housing and an internally located rotor with a drive shaft, and, in particular, has a cylindrical bearing housing on the drive side. The bearing housing protrudes, along with a bearing and the drive shaft ducted therein, into an opening in the gear housing. The invention further relates to a use of the actuator in a motor vehicle.

BACKGROUND

Actuators, for example window operating actuators and actuators for operating a sliding roof, are already known. They have a gear unit and a motor unit. The gear unit has a worm wheel and a gear shaft implemented as a worm shaft. The motor unit consists of a motor housing, a brush housing, and an internally located rotor. The rotor is therein embodied as what is termed a laminated rotor core having a plurality of lamella segments secured on the motor shaft. The gear shaft and motor shaft can also be embodied as a single piece forming a common drive shaft. The motor housing is flange-mounted onto the gear housing when the actuator is assembled. A mostly cylindrical extension of the brush housing protrudes with the drive shaft and the worm shaft located on the drive shaft's free end into a corresponding opening in the gear housing. The extension of the brush housing serves as a support for a bearing in which the drive shaft is ducted. The cylindrical extension can also be embodied as a separate bearing housing or, alternatively, can form a common brush and bearing housing with the brush housing.

An actuator wherein a motor housing is flange-mounted onto a gear housing is known from EP 0 869 295 A2. The motor housing protrudes partly into an opening in the gear housing, with the protruding part enclosing a cap bearing in which is ducted a motor shaft.

The bearing located opposite the gear and housed in the cylindrical bearing housing serves as a compensating element for compensating manufacturing tolerances when the actuator is assembled. The bearing is therein to some extent moveable axially in its support. If the bearing is a cap having a spherical outer surface able to move within certain limits in a spherical shell corresponding thereto of the bearing support, then it will also be possible to compensate warps in the drive shaft and radial displacements thereof. Pretensioning is applied to said bearing so that it will remain fixed in its position after assembly.

A frequent problem is that the bearing inserted along with the cylindrical bearing housing into the opening in the gear housing becomes loose after a certain period of operation and that, in the case of a cap, this can twist in its bearing shell. This is caused by settling processes to which plastics are subject when under a permanent load. Pretensioning that is still present in the new condition will be reduced thereby in such a way that the bearing or, as the case may be, the cap will over time begin to work loose in the bearing support. This results in wear and tear on the bearing or, as the case may be, cap and hence in premature failure of the actuator. Increasingly more noise is also produced when the actuator is operated.

To resolve the problem it is known how to employ what is termed a clamping collar, made of spring steel, which exerts a clamping force on the bearing or, as the case may be, the spherical outer surface of the cap. A permanent frictional force is exerted thereby between the gear housing and the bearing housing so that non-twisting and axial securing of the bearing are achieved. What is disadvantageous about this solution are the increased component requirements and the assembly effort required.

SUMMARY

The object of the invention is to provide a simplified actuator facilitating permanent securing of a bearing in position.

This object can be achieved by an actuator, comprising a gear unit and a motor unit, the gear unit having a gear housing and the motor unit having a motor housing and an internally located rotor with a drive shaft and a bearing housing on the drive side, wherein the bearing housing protrudes, along with a bearing and the drive shaft ducted therein, into an opening in the gear housing, wherein the outside of the bearing housing and the inside of the opening in the gear housing have been geometrically mutually harmonized such that clamping points and tension-free places will form between them when the actuator has been assembled.

A pretensioning force impacting on the bearing via the bearing housing can be established by means of the clamping points. At least one circumferential pretensioning force can be established by means of the clamping points in the area of the bearing. In each case a circumferential pretensioning force can be established by means of the clamping points in a respective axial end area of the bearing. The internal cross-section of the opening in the gear housing may remain essentially the same in the area of the bearing, and elevations can be provided as clamping points on the outer circumference of the bearing housing. The elevations may form at least one bulge around the outer circumference of the bearing housing. The elevations or, as the case may be, the at least one bulge can be located in a respective axial end area of the bearing. The cross-section of the bearing housing may reduce axially in at least one stage in the area of the bearing, the internal cross-section of the opening in the gear housing in a corresponding manner may reduce axially in at least one stage, and corresponding stages may form the clamping points when the bearing housing has been inserted into the opening in the gear housing. The cross-section of the bearing housing may reduce in one stage in each case in the axial end area of the bearing, and in a corresponding manner the internal cross-section of the opening in the gear housing also may reduce axially in two stages. The corresponding stages can be slanted in such a way that they will clamp together through latching. The bearing housing and the opening in the gear housing can be embodied as being cylindrical. The bearing can be a cap. The bearing housing can be a part of a combined brush and bearing housing. The bearing housing or, as the case may be, the combined brush and bearing housing can be a plastic injection-molded part. Such an actuator can be used in a motor vehicle.

By means of the clamping points a pretensioning force is advantageously exerted that will permanently secure the bearing in position throughout the actuator's scheduled operating life. The pretensioning force in turn produces an advantageously permanent frictional engagement between the bearing's outer circumference and the bearing shell located opposite it. In particular gaps as tension-free places form areas in which a pretensioning reserve can be established that impacts permanently on the bearing.

A further advantage is that the operating life of an actuator of said type is increased.

The increase in noise produced by an actuator of said type over its operating life is, moreover, advantageously reduced.

By means of the clamping points a pretensioning force can in one embodiment be established that impacts on the bearing via the bearing housing. Said pretensioning force therein advantageously impacts in the area of the bearing at least circumferentially. Associated therewith is the advantage that an even pretensioning force is exerted on the bearing from all sides.

In a preferred embodiment a circumferential pretensioning force can in each case be established by means of the clamping points in a respective axial end area of the bearing.

A centering force is advantageously exerted on the bearing through the bearing's lateral mounting in terms of forces. Any possible pretensioning forces that impact laterally on the bearing and could in certain circumstances result in its skewing are in this way avoided. Through the centering force the bearing is, moreover, particularly well secured axially in position and, in the case of a cap as the bearing, against twisting. The bearing remains, so to speak, clamped between both circumferentially applied pretensioning forces.

In a further embodiment the internal cross-section of the opening in the gear housing remains essentially the same in the area of the bearing. Said internal cross-section is in particular circular therein. Elevations are provided as clamping points on the outer circumference of the bearing housing.

The pretensioning force is inventively produced by the elevations provided on the outside or, as the case may be, the outer circumference of the bearing housing. Said elevations can therein be located at specific points or linearly on the bearing housing's outer circumference. Said elevations can, for example, also be shaped as lenticles or posts a maximum of 1 mm in height. By means of the elevations a pretensioning force is exerted via the bearing housing onto the outer circumference of the bearing housed therein. The pretensioning force in turn produces a frictional engagement between the outer circumference of the bearing and the bearing shell located opposite the outer circumference.

The elevations preferably form at least one bulge around the outer circumference of the bearing housing so that the pretensioning force will impact advantageously evenly on the bearing's outer circumference.

In a preferred embodiment the elevations or, as the case may be, the at least one bulge are/is located in a respective axial end area of the bearing so that the in each case circumferential pretensioning force can advantageously have a centering impact on the bearing.

In an alternative embodiment the cross-section of the bearing housing reduces axially in at least one stage in the area of the bearing. In a corresponding manner the internal cross-section of the opening in the gear housing also reduces axially in at least one stage. The opening in the gear housing therein narrows axially toward the worm shaft.

The centering effect of the narrowing also makes it easier to insert the bearing housing into the opening in the gear housing when the actuator is being assembled. The corresponding stages will clamp together when the bearing housing has been inserted, in particular shortly before the final insertion position is reached, to form inventive clamping points.

Associated therewith is the major advantage that a permanent pretensioning force will be produced by the clamping together of the respective stages, which in turn produces an advantageously permanent frictional engagement between the bearing's outer circumference and the bearing shell located opposite it. The stage height is preferably less than 1 mm, being in particular in a range of 0.1 to 0.5 mm.

The cross-section of the bearing housing preferably reduces in the axial end area of the bearing in one stage in each case. In a corresponding manner the internal cross-section of the opening in the gear housing reduces axially in two stages. Mutually corresponding stages will as a result clamp together in the internal cross-section of the opening in the gear housing and on the outer circumference of the bearing housing to form the inventive clamping points. The consequently arising circumferential pretensioning forces will advantageously have a centering impact on the bearing.

The stages can in particular be slanted in such a way that they will clamp together through latching. The stages are in this case preferably slanted within a range of 30° to 60°.

Said latching, which occurs suddenly, will produce particularly stable clamping which, moreover, will be acoustically perceptible as a clicking sound when the actuator is being assembled. Said clicking sound can advantageously be regarded as a signal confirming successful latching when an actuator is being assembled.

For both embodiments the bearing is preferably a cap having a spherical outer surface. Said outer surface is able to move within certain limits in a spherical shell corresponding thereto of the bearing support. Any warping due to manufacturing and/or assembly tolerances and any radial displacement of the drive shaft to a slight extent will be advantageously compensated by the possible compensatory twisting of the cap.

The cap is preferably made of a sintered material. That will enable the porous structure of the sintered material to absorb a lubricant, in particular a lubricating oil, for lubricating the drive shaft ducted inside the cap.

In a further embodiment the bearing housing is a part of a combined brush and bearing housing. Customarily provided on the outside of the corresponding brush housing are plug-in contacts electrically ducted inside the brush housing to the brushes in the commutator area of the rotor.

The number of components and assembly steps needed for an actuator are advantageously reduced by a combined brush and bearing housing of said type.

In a particular embodiment the bearing housing or, as the case may be, the combined brush and bearing housing with the elevations, bulges, or stages is a plastic injection-molded part. Possible plastics are, for example, polypropylene or polyamide. A particularly suitable type of plastic is PA 6.6.

The plastic exhibits a certain elasticity that is particularly suitable for establishing a pretensioning force in response to a mechanical deformation. In the case of the bearing housing the elastic mechanical deformation is caused by ensuing bending moments during insertion into the opening of the gear housing.

Through the injection molding method it is furthermore advantageously possible to produce a complex component, such as, for instance, the combined brush and bearing housing with the integrated motor bearing, in one manufacturing step.

An actuator according to the invention can be advantageously employed in a motor vehicle because a large number of compact actuators, for example for operating windows and opening and closing a sliding roof, are needed there in particular.

BRIEF DESCRIPTION OF THE DRAWINGS

Further advantageous characteristics of the invention will emerge from its exemplary explanation with reference to the figures.

DETAILED DESCRIPTION

Figure 1:
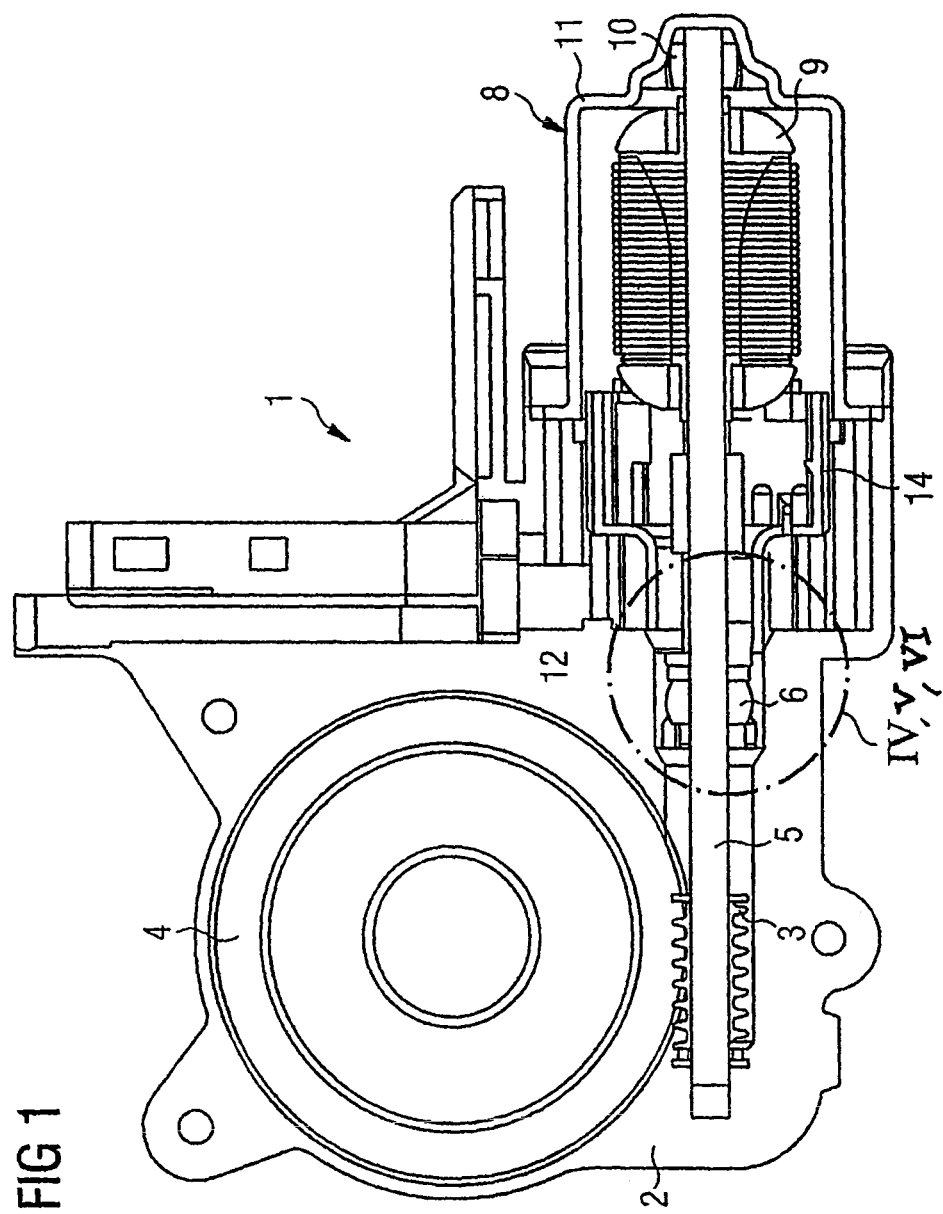
FIG. 1 is a sectional drawing of an exemplary actuator with a gear housing and with a motor housing according to the invention.

FIG. 1 is a sectional drawing of an exemplary actuator 1 having a gear unit 2 and a motor unit 8. The gear unit 2 has a gear housing 12 in which are housed a worm wheel 4 and a worm shaft 4 engaging with the worm wheel 4. The motor unit 8 consists of a motor housing 11, of a rotor 9 housed therein with a drive shaft 5, and of a bearing housing 18 on the drive side of the motor unit 8. The worm shaft 3 is seated on the free end of the drive shaft 5, with said drive shaft 5 being driven by the motor unit 8 and being housed partly in the motor housing 11. The drive shaft 5 is ducted on the motor side in a bearing 6 located opposite the gear unit 2 and in a motor bearing 10. In the example shown in FIG. 1 the drive shaft 5 is embodied as a single piece. A two-piece embodiment of the drive shaft 5 as a motor shaft and a gear shaft having an intermediate connecting element is likewise conceivable.

Figure 2:
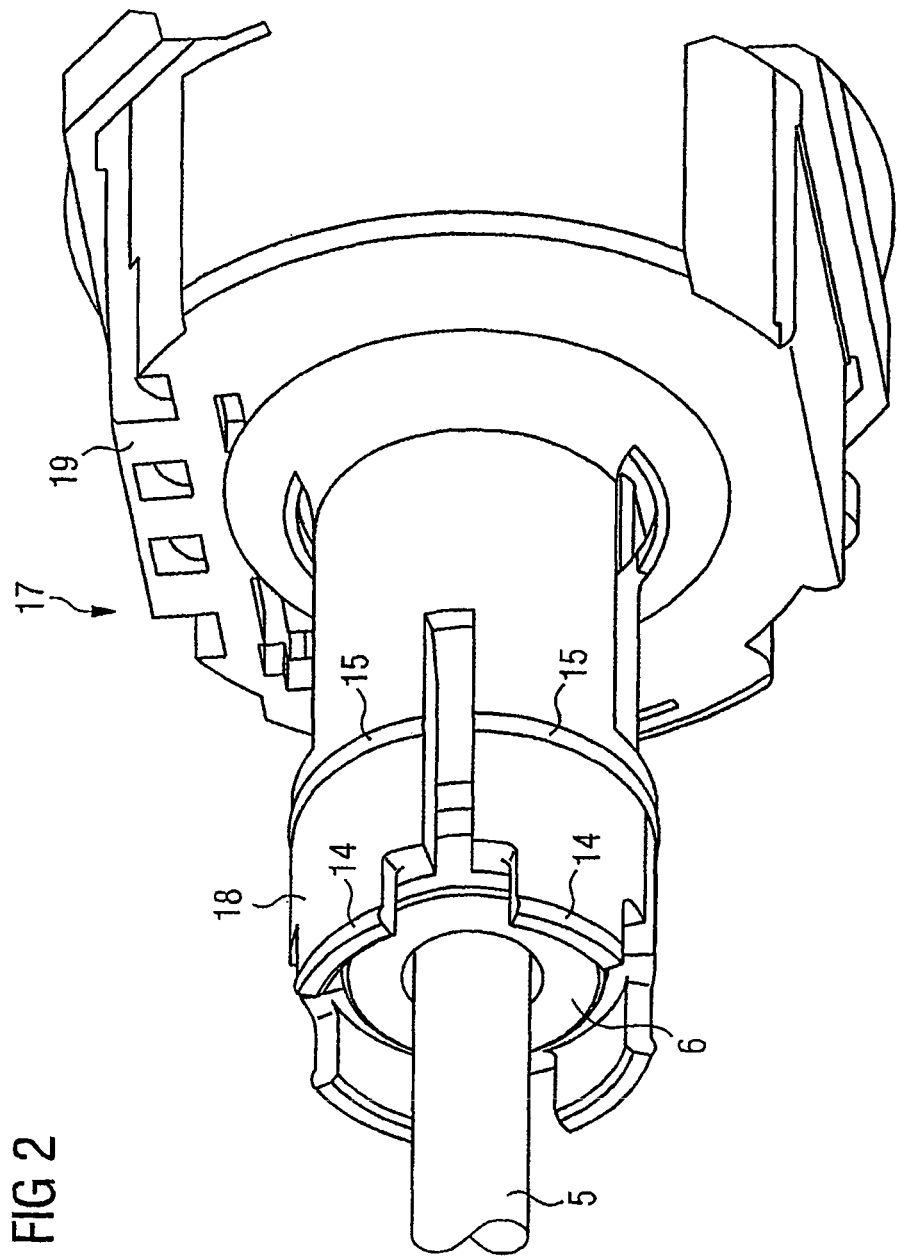
FIG. 2 is a perspective schematic of a combined brush and bearing housing with inventive elevations according to FIG. 1.

FIG. 2 is a perspective schematic of a combined brush and bearing housing 17 corresponding to FIG. 1. The brush and bearing housing 17 is composed of a brush housing 19 with electrical terminals and carbon brushes housed therein for the commutator of the rotor 9 and of a bearing housing 18 with the bearing 6 housed therein. The bearing housing 18 is embodied as being essentially cylindrical so that it can easily be inserted into a corresponding opening 7 of the gear housing 12.

According to the invention, elevations 14, 15 have been applied as clamping points on the outside or, as the case may be, the outer circumference of the bearing housing 18 which, according to one embodiment of the actuator, are embodied as circumferential bulges. According to a further embodiment the elevations 14, 15 or, as the case may be, the circumferential bulges are arranged in such a way that, viewed in the axial direction, in each case one bulge 14, 15 is located in the end area of the bearing 6. According to a further inventive embodiment in the example shown in FIG. 2 the bearing 6 is a cap.

Figure 3:
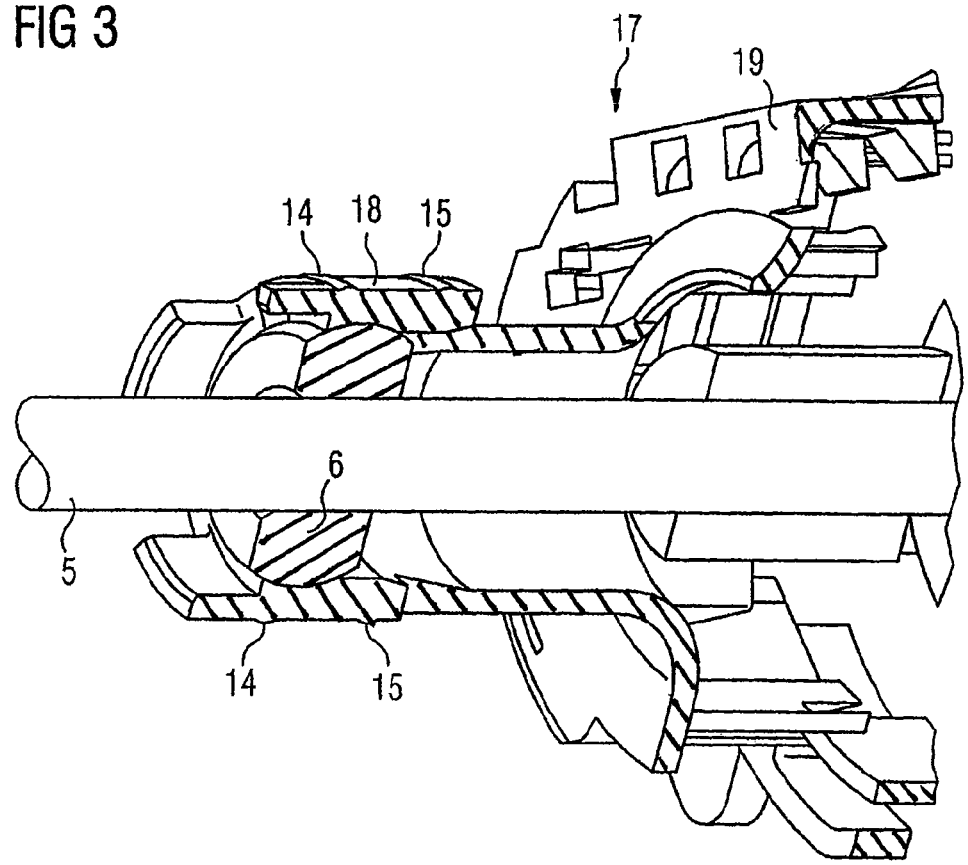
FIG. 3 is a perspective schematic corresponding to FIG. 2 giving an elevated view along the drive shaft of the actuator.

FIG. 3 is a perspective schematic corresponding to FIG. 2 giving an elevated view along the drive shaft 5 of the actuator 1. In particular the embedding of the cap 6 with its spherical outer surface into the bearing housing 18 can be seen in that representation.

Figure 4:
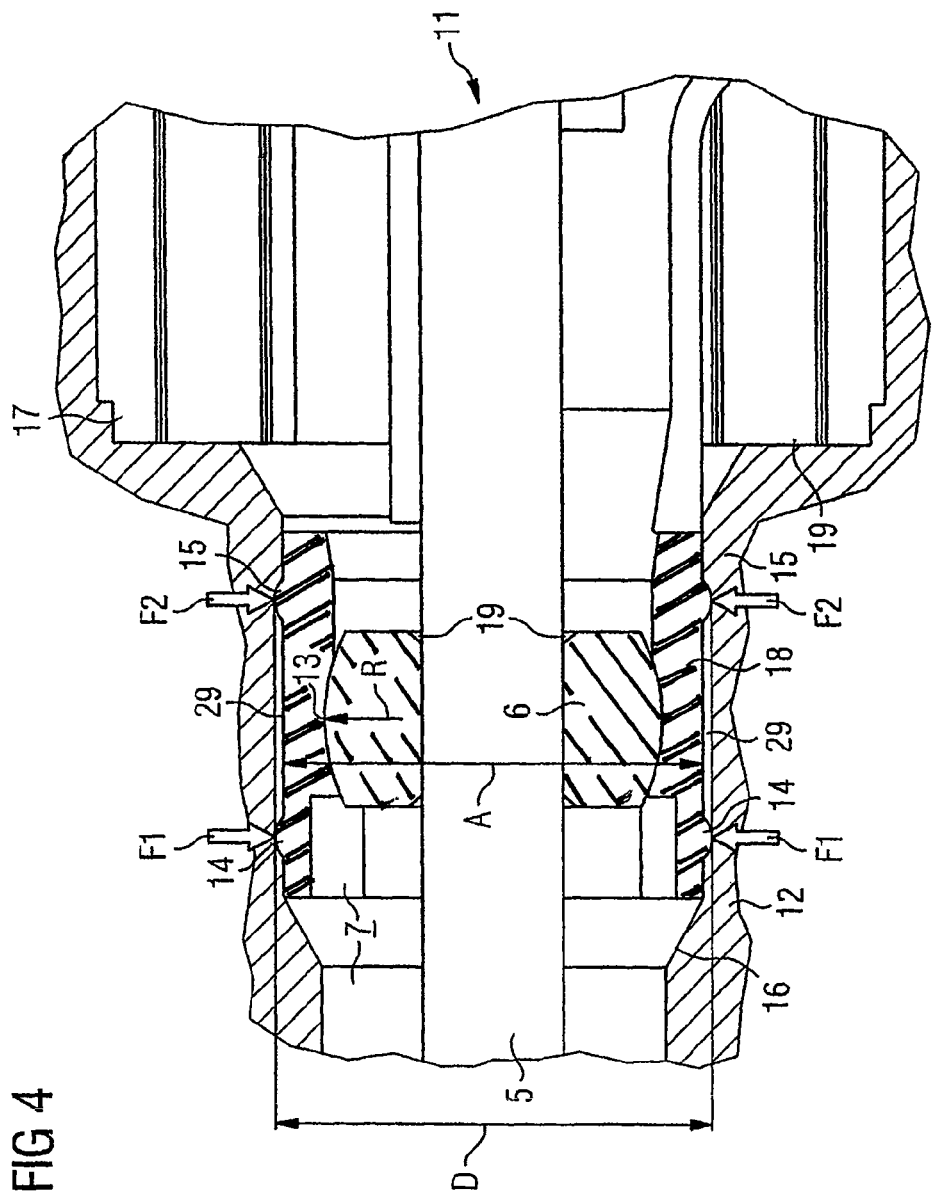
FIG. 4 is an enlarged representation of a bearing housing protruding into an opening in the gear housing according to FIG. 1.

FIG. 4 is an enlarged representation of a bearing housing 18 protruding into an opening 7 in the gear housing according to FIG. 1. Shown in the right-hand section of FIG. 4 is part of the brush housing 17 of a combined brush and bearing housing 11. The corresponding cylindrical bearing housing 18 with the bearing 6 can be seen in the left-hand section of the figure. When the actuator 1 is in the installed condition the marked outer diameter A of the bearing housing 18 is slightly less than the inside diameter D of the opening 7 in the gear housing. This is because of the distancing of the outer circumference of the bearing housing 18 by means of the inventive elevations 14, 15 or, as the case may be, the circular bulges. The pretensioning forces F1, F2 established between the two bulges 14, 15 therein have a centering impact toward the center of the bearing 6. The tension-free gap 29 arising between the bulges advantageously forms an area for establishing a pretensioning reserve. The bearing housing 18 can then, as it were, "arch" into said area.

The FIG. 4 shows the embodiment of the bearing 6 as a cap in which the drive shaft 5 is ducted. R is the maximum radius of the spherical outer surface. The reference numeral 13 indicates the contour of the bearing shell located opposite. The cap 6 is chamfered on its inside 19 so that compensatory twisting by the cap 6 is to a certain extent possible. The opening 7 in the gear housing exhibits tapering 16 in the axial direction toward the worm shaft 3 serving to center the worm shaft 3 when the drive shaft 5 is inserted into the opening 7 in the gear housing.

Figure 5:
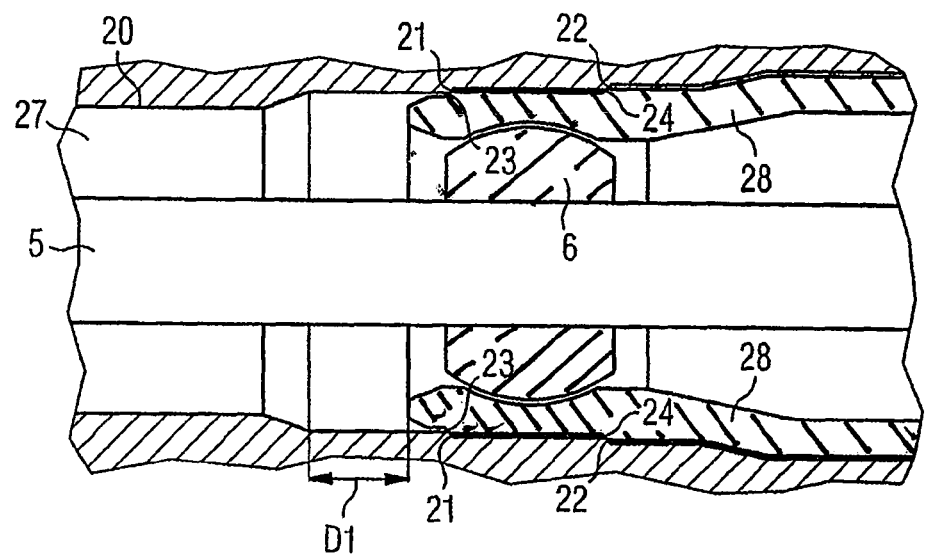
FIG. 5 is a sectional drawing of an exemplary alternative solution for establishing a pretension by means of inventive stages and before reaching a final insertion position of the bearing housing in the opening in the gear housing.

FIG. 5 is a sectional drawing of an exemplary alternative solution for establishing a pretension F1, F2 by means of stages 21-24 and before reaching a final insertion position of the bearing housing 28 in the opening 27 in the gear housing. Both the stages 23, 24 on the bearing housing side and the stages 21, 22 corresponding thereto on the gear housing side are already slanted in the example shown in FIG. 5. The angle is between 30° and 60°, being about 45° in the example shown in FIG. 5. The bearing housing 6 is in this way made easier to insert into the opening 27 of the gear housing 12. The distance from further tapering on the opening side and from an end of the bearing housing 28 is marked with D1. Present FIG. 5 shows also that the bearing housing 6 has in this insertion position been inserted relatively loosely into the opening 27 in the gear housing. That is indicated also by the gap, shown enlarged for clarity's sake, between the cap 6 and the bearing shell of the bearing housing 28 surrounding this.

Figure 6:
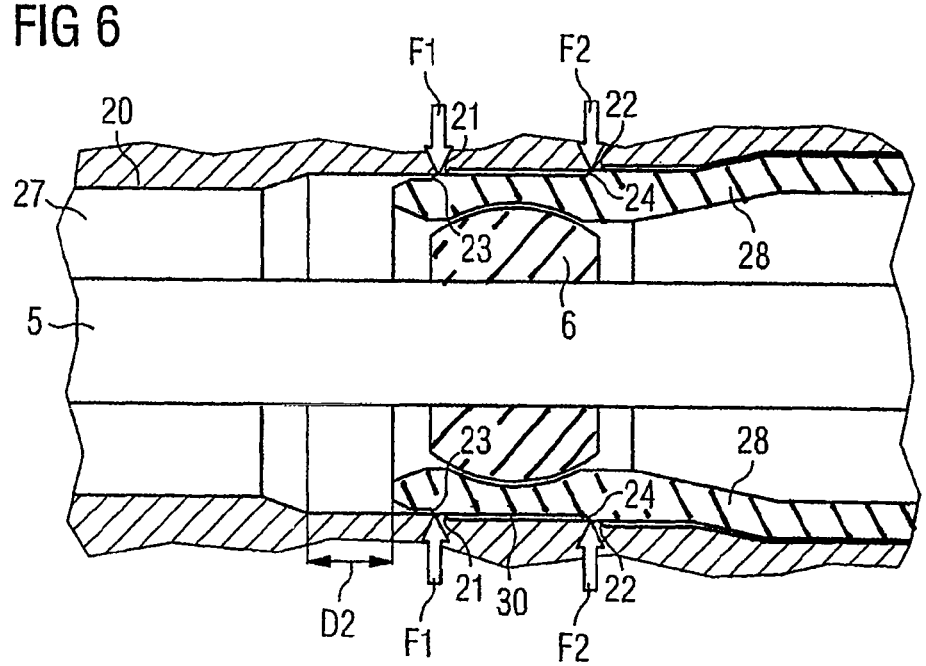
FIG. 6 is a sectional drawing according to FIG. 5 after reaching a final insertion position of the bearing housing in the opening in the gear housing.

FIG. 6 is a sectional drawing according to FIG. 5 after reaching a final insertion position of the bearing housing 28 in the opening 27 in the gear housing. That can be seen in the example shown in FIG. 6 by the fact that the distance D2 between the further tapering on the opening side and the end of the bearing housing 28 has reduced slightly, such as, for example, within a range of 0.5 mm to 2 mm. After reaching the final insertion position the mutually corresponding stages 21, 23 and 22, 24 will then be clamped together in such a latching manner that the inventive pretensioning F1, F2 will be established in the overlapping areas. That can be seen in FIG. 6 also by the fact that the gap still present in FIG. 5 between the surface of the cap and the bearing shell located opposite it has now disappeared. The cap 6 is now permanently secured in its position. Gaps 30, 31 furthermore embody themselves as tension-free places serving as areas for establishing a pretensioning reserve.

What is claimed is:

1. An actuator, comprising a gear unit and a motor unit, the gear unit having a gear housing and the motor unit having a motor housing and an internally located rotor with a drive shaft and an essentially cylindrical one piece bearing housing on the drive side, wherein the bearing housing protrudes, along with a bearing housed therein and the drive shaft ducted therein, into an opening in the gear housing, wherein the outside of the bearing housing and the inside of the opening in the gear housing have been geometrically mutually harmonized such that clamping points and tension-free places will form between them when the actuator has been assembled, and wherein a circumferential pretensioning force impacting on the bearing via the bearing housing is established by means of the clamping points at respective axial end areas of the bearing, wherein elevations are provided as clamping points on the outer circumference of the bearing housing, the elevations are located in a respective axial end area of the bearing.

2. An actuator according to claim 1, wherein a respective circumferential pretensioning force is established by means of the clamping points in a respective axial end area of the bearing.

3. An actuator according to claim 1, wherein the bearing housing and the opening in the gear housing are embodied as being cylindrical.

4. An actuator according to claim 1, wherein the cross-section of the bearing housing reduces axially in at least one stage in the area of the bearing, the internal cross-section of the opening in the gear housing in a corresponding manner reduces axially in at least one stage, and wherein corresponding stages will form the clamping points when the bearing housing has been inserted into the opening in the gear housing.

5. An actuator according to claim 4, wherein the cross-section of the bearing housing reduces in one stage in each case in the axial end area of the bearing, and in a corresponding manner the internal cross-section of the opening in the gear housing also reduces axially in two stages.

6. An actuator according to claim 4, wherein the corresponding stages are slanted in such a way that they will clamp together through latching.

7. An actuator according to claim 1, wherein the bearing is a cap.

8. An actuator according to claim 1, wherein the bearing housing is a part of a combined brush and bearing housing.

9. An actuator according to claim 8, wherein the bearing housing or, as the case may be, the combined brush and bearing housing is a plastic injection-molded part.

10. A method of using an actuator according to claim 1 in a motor vehicle.

11. An actuator, comprising a gear unit and a motor unit, the gear unit having a gear housing and the motor unit having a motor housing and an internally located rotor with a drive shaft and an essentially cylindrical one piece bearing housing on the drive side, wherein the bearing housing protrudes, along with a bearing housed therein and the drive shaft ducted therein, into an opening in the gear housing, wherein the outside of the bearing housing and the inside of the opening in the gear housing have been geometrically mutually harmonized such that clamping points and tension-free places will form between them when the actuator has been assembled, wherein a circumferential pretensioning force impacting on the bearing via the bearing housing is established by means of the clamping points at respective axial end areas of the bearing, wherein elevations are provided as clamping points on the outer circumference of the bearing housing, the elevations are located in a respective axial end area of the bearing.

12. An actuator according to claim 11, wherein the cross-section of the bearing housing reduces axially in at least one stage in the area of the bearing, the internal cross-section of the opening in the gear housing in a corresponding manner reduces axially in at least one stage, and wherein corresponding stages will form the clamping points when the bearing housing has been inserted into the opening in the gear housing.

\* \* \* \* \*